United States Patent [19]
Tong

[11] Patent Number: 4,809,012
[45] Date of Patent: Feb. 28, 1989

[54] DIRECTION FINDING EQUIPMENT
[76] Inventor: David A. Tong, 6 Arncliffe Road, Leeds 16, England
[21] Appl. No.: 54,758
[22] Filed: May 27, 1987
[30] Foreign Application Priority Data
  May 27, 1986 [GB] United Kingdom ............... 8612753
[51] Int. Cl.$^4$ ........................................... H01Q 21/00
[52] U.S. Cl. ..................................... 343/853; 342/442
[58] Field of Search .............. 343/853; 342/384, 417, 342/423, 442, 445

Primary Examiner—William L. Sikes
Assistant Examiner—Robert E. Wise
Attorney, Agent, or Firm—Fisher, Christen & Sabol

[57] ABSTRACT

Radio direction finding equipment has an array of direction finding antennas. The antennas are connected to receivers and signals from the antennas are processed, for example with a microcomputer, to give direction information derived from the phase difference between the signals. A reference antenna is also provided and this is of greater sensitivity than the other antennas. The direction information is derived from phase differences determined between the signal from the reference antenna and the signals from the other antennas.

7 Claims, 1 Drawing Sheet

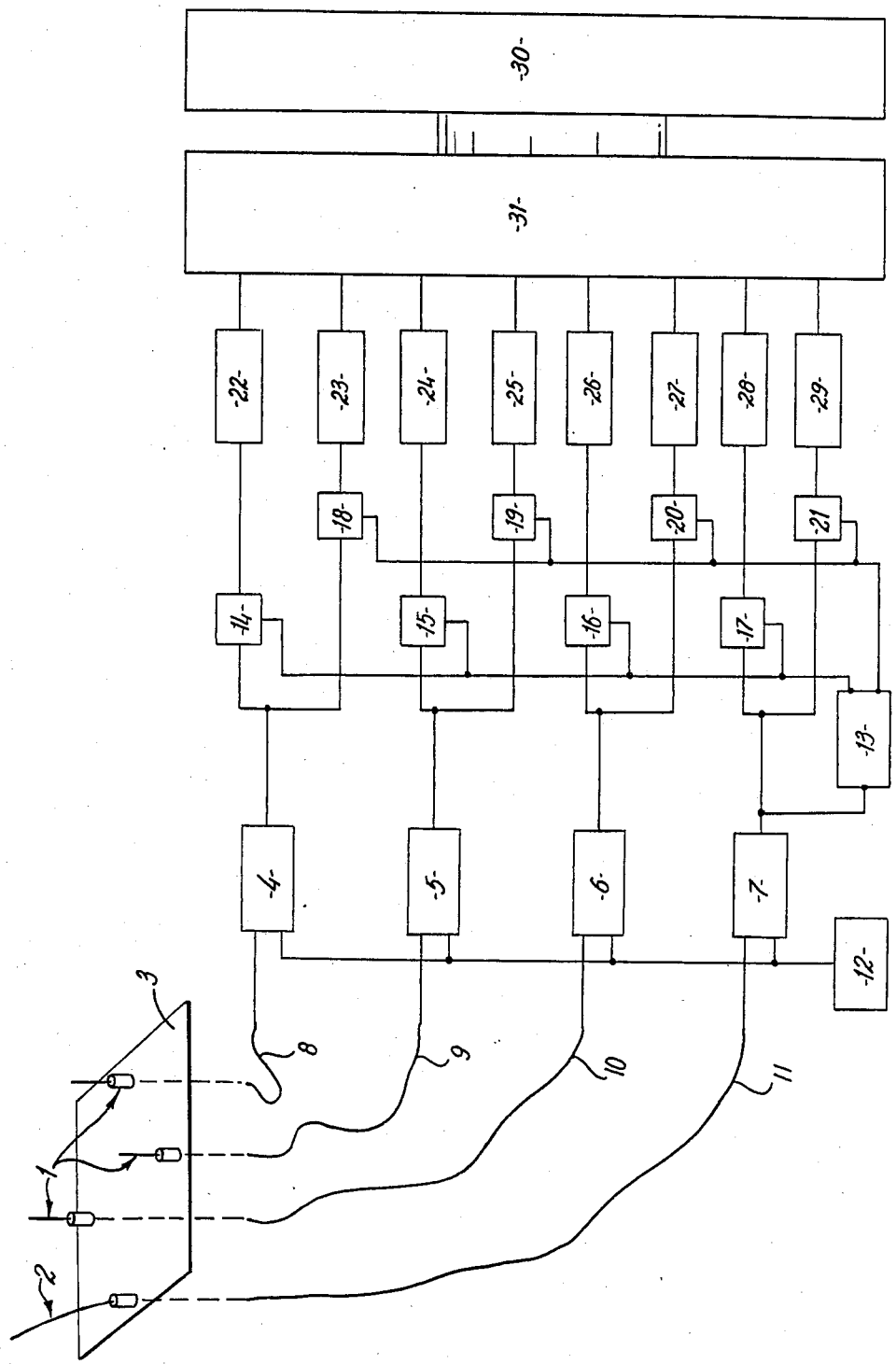

DIRECTION FINDING EQUIPMENT

This invention relates to direction finding equipment.

A known kind of radio direction finding equipment used to determine the bearing of a radio transmitter has an array of three or more non-colinear antennas. The RF signals at the antennas are modulated at low (audio) frequencies and are then combined and processed by a single AM or FM receiver. The choice of receiver depends on the method of combination. After a detector stage of the receiver the de-modulated RF signals are separated by phase sensitive detection methods using the modulation waveforms as reference signals and then low pass filtered and processed to give phase difference values which provide information as to the bearing of the received radio signal. The RF signals before de-modulation may be processed together with a reference signal derived from a reference antenna of the array to cancel out the effect of any intrinsic frequency modulation or frequency drift of the received radio signal.

With this known arrangement, due to widening of the received signal bandwidth due to the modulation technique, the frequency range of the information-carrying signals before the detection stage of the receiver is relatively wide. Accordingly, to ensure that these signals are not rejected, the receiver has to have a relatively wide band width, say of the order of KHz. Because the de-modulators are non-linear devices noise in the wide receiver bandwidths is mixed into the df processor bandwidth. Since this prevents effective noise elimination the antenna signals fed to the receiver must have a high signal to noise ratio and the practice therefore is to use antennas of appreciable size. By way of example, the antenna array may have antennas consisting of half-wave dipoles. These are comparable in efficiency to normal communication antennas and the antenna array may be difficult or inconvenient to manufacture and install, it may give undue wind resistance, it may be difficult to conceal and bearing errors may occur due to excessive mutual coupling.

An object of the present invention is to provide direction finding equipment having improved sensitivity and selectivity and which does not necessitate the use of a large, obtrusive antenna array.

According to the invention therefore there is provided radio direction finding equipment comprising an array of direction finding antennas, and radio receiving apparatus arranged to process signals received by the respective direction finding antennas to produce direction information derived from phase differences between said signals, characterised in that there is also provided a reference device arranged to produce a reference signal having a frequency related to the actual frequency of the signals received by the antennas but of greater signal to noise ratio than said signals, said radio apparatus being arranged to produce said direction information derived from phase differences determined between the said reference signal and the respective said received signals.

With this arrangement because the received signals are processed with reference to a reference signal having a fixed frequency relationship with the received signals (e.g. the same frequency), it is possible to produce a phase-difference output which has a narrow bandwidth centred on the reference signal frequency. Noise can therefore be efficiently removed from the phase-difference output by use of a narrow band filter. Accordingly, the direction finding equipment can operate with high sensitivity and selectivity even with relatively small antennas in the array; that is, the sensitivity can be determined largely by the reference signal rather than the direction finding antennas. In practice, the elements in the array of direction finding antennas can be of reduced dimensions compared with the size of array that would be necessary to achieve the same sensitivity with conventional direction finding equipment. Alternatively, a same size array may be used to give enhanced sensitivity.

With regard to the reference signal, this may be obtained from a reference antenna which is of greater sensitivity than other antennas of the direction finding array. Thus, the reference antenna may be of appreciably greater size than the other antennas. By way of example, with vehicle mounted radio direction finding equipment, the reference antenna may be a long whip (e.g. of the kind commonly used as car radio aerials) and the other antennas may be, for example, over 20 db less sensitive and therefore much shorter.

Any suitable antenna arrangement may be used as required. In a system designed for 360° coverage three or more simple direction finding dipoles or whips which are omnidirectional and have a well defined phase centre with a simple mechanical arrangement may be used, the reference antenna where provided being a separate much longer whip or other structure. Other arrangements are also possible. For example, if the direction finding antennas are matched dipoles the reference antenna may be an omnidirectional vertical colinear design mounted coaxially with the direction finding antennas, or a directional gain antenna such as a Yagi mounted at some convenient distance from the direction finding antennas. It is also possible to use the reference antenna as one of the direction finding antennas in which case a phase correction will be required to compensate for the anomolous phase shift of the more sensitive reference antenna relative to the others. This can conveniently be done in software using a signal of known direction as a test signal.

Most preferably the radio apparatus which receives the signals from the different antennas comprises a receiver dedicated to the reference antenna, and other separate receivers, one for each antenna in the df array, and all using the same local oscillators. Each receiver amplifies and processes the respective antenna signal linearly without modulation. In this way the output signal to noise ratio can be made to approach closely that of the reference signal.

Alternatively, the df antennas can be commutated successively into a single receiver (i.e. connected by switching circuits successively in a predetermined repeated sequence to the single receiver), with a second receiver being dedicated to the reference antenna. Most preferably, the two receivers have the same local oscillators but this is not essential. With this arrangement also, the output signal to noise ratio can be made to approach closely that of the reference signal.

With separate receivers there is the problem of ensuring that their phase characteristics are the same. Since this is difficult to achieve in practice, a self-calibration process may be used whereby at periodic intervals the antennas are disconnected and a signal of identical phase and amplitude is applied to the inputs of all the receivers. The phase differences between the receivers can then be calculated and appropriate compensation can be made. This can be done under microprocessor control whereby no special stability requirements are placed on the receivers.

The determination of phase differences for the respective direction finding antennas may be effected using lock-in amplifiers or equivalent in software. The reference signal is used as the control frequency for each lock-in amplifier and such signal is mixed with the respective antenna signal to give a d.c. output representative of the phase difference. The output can be filtered with a narrow band low pass filter to remove noise, and the different d.c. outputs pertaining to the different direction finding antennas are processed in pairs to give bearing information in accordance with known interferometer principles. The width of the pass band of the filter can be very small since the reference signal and the direction finding signal have the same frequency. In practice the width may be up to a few Hz. The limiting factor is the response time - the response time increases as the bandwidth reduces, but the most practical applications low bandwidths of about 1 Hz are feasible.

In the case where the df antennas are commutated as mentioned above, and where non-identical local oscillators are used, the pair of lock-in amplifiers described above will produce not DC but a difference frequency equal to the small difference between the local oscillators in the two receivers. In this case the desired phase differences can be measured by autocorrelation methods in which the real-time signals from the lock-in amplifiers are multiplied with similar signals delayed by precisely one commutation dwell period (typically 5 ms) and averaged for the same period. The DC outputs from the autocorrelation process can then be filtered with narrow band low pass filters to remove noise, the different DC outputs corresponding to each commutation period then being processed to give the bearing by known interferometer principles. Bandwidth reductions of about 1 Hz are again feasible. In this case an additional phase "error" should be allowed for in the interferometric calculation. It's value depends on the precise relationship between the "difference frequency" and the time delay value. The phase error is conveniently measured by a similar autocorrelation procedure but using a time delay precisely equal to one half of the previous delay. The whole of the above processing may be achieved either in hardware or in software or some convenient mixture of the two.

The invention will now be described further by way of example only and with reference to the accompanying drawing which is a block circuit diagram of one form of radio direction finding equipment according to the invention.

There are three equal small-sized low sensitivity direction finding antennas 1 mounted in a non-colinear array of known geometry, and one larger reference antenna 2 (e.g. a whip antenna) of greater sensitivity. The antennas are mounted on a metal ground plane 3 (e.g. a vehicle surface). The four antennas are connected to four receivers 4–7 with IF outputs, which are separate but have essentially identical (or calibrated phase characteristics). The antennas 1, 2 are connected by four matched coaxial cables 8–11 to the receivers 4–7.

The receivers 4–7 comprise amplifiers which are linear for small signals and may be arranged to derive a desired lower intermediate frequency from the antenna signals using a local beat frequency from a common local oscillator 12.

The IF output of the reference receiver 7 is split, by a phase splitter 13, into two channels which differ in phase by 90° and the two phase quadrature signals are used to multiply the IF output of each direction finding receiver 4–6 using lock-in amplifiers (four-quadrant analogue multiplier) 14–21. The result is a pair of D.C. voltages (or equivalent in software) for each direction finding receiver and these voltages are then low pass filtered, using identical low pass filters 22–29. Each pair can then be processed (taking ARCTAN y/x) to give the phase difference between the reference antenna 2 and the particular direction finding antenna 1, and then by subtracting appropriate pairs of angles, the phase differences between the pairs of direction finding antennas can be derived. These are then used to calculate the bearing. The processing is effected with a suitably programmed microcomputer 30, and a multi-channel analogue to digital converter 31 is provided to interface the filter outputs to the computer 30.

With the above embodiment it is possible to achieve good sensitivity without requiring large and obtrusive direction finding antennas. Also, the direction finding antennas need not be resonant or power matched to the receiver. They can therefore have a wider bandwidth and will interact less with the RF field and with each other so that errors caused by such mutual interactions are reduced.

It is of course to be understood that the invention is not intended to be restricted to the details of the above embodiment. For example, four direction finding antennas in a square formation or as two separate pairs may be used. Further, the reference antenna may also act as one of the df antennas. Also instead of using receivers with a common local oscillator it is possible to use non-identical local oscillators. Instead of using separate receivers for the df antennas, a commutated arrangement may be used in which the df antennas are connected successively to a common receiver in accordance with a predetermined timed, repeated sequence, an appropriate known switching arrangement being provided to control this.

I claim:

1. Radio direction finding equipment comprising:
   a. an array of antennas for receiving radio signals, one said antenna being of reference antenna of greater sensitivity than the other said antennas;
   b. at least one radio receiving means connected to said antennas so as to produce signal outputs derived respectively from the radio signals received by the different said antennas;
   c. difference means connected to said at least one radio receiving means so as to produce difference outputs derived respectively from phase differneces between the said signal output derived from the radio signals received by the said reference antenna and the said signal outputs derived from the radio signals received by the said other antennas; and
   d. processing means for processing said difference outputs to provide information to the direction of the received radio signals.

2. Radio direction finding equipment according to claim 1, wherein the reference signal is obtained from a reference antenna which is of greater sensitivity than other antennas of the direction finding array.

3. Radio direction finding equipment according to claim 2, wherein the reference antenna is of greater size than the other antennas.

4. Radio direction finding equipment according to claim 3, which is vehicle mounted and wherein the reference antenna is a whip antenna.

5. Radio direction finding equipment according to claim 4, wherein the array of antennas comprises at least three omnidirectional dipoles and the reference antenna is separate thereto.

6. Radio direction finding equipment according to claim 1 wherein the said radio receiving means comprises a separate receiver for each antenna which receives, amplifies and processes the respective antenna signal without modulation.

7. Radio direction finding equipment according to claim 1 wherein lock-in amplifiers are used to determine the phase differences for the respective direction finding array of antennas, the reference signal being used as the control frequency for each lock-in amplifier and such signal being mixed with the respective antenna signal to give a d.c. output representative of the phase difference.

* * * * *